Figure 1:
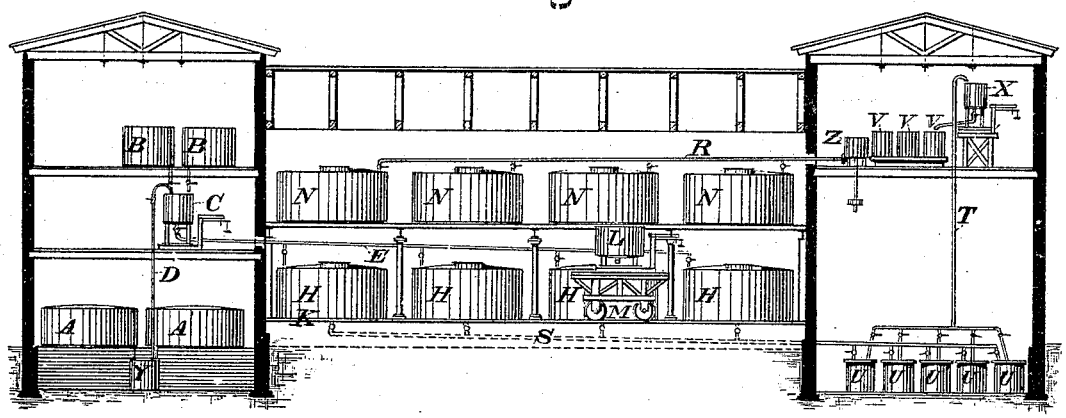

(No Model.) 2 Sheets—Sheet 1.

J. W. HYATT, F. V. POOL, J. EVERDING, J. H. STEVENS & W. H. WOOD.
APPARATUS FOR THE MANUFACTURE OF NITRO CELLULOSE.

No. 299,388. Patented May 27, 1884.

Witnesses:
Herman Gustow
William B. Ellerson

Inventors,
John W. Hyatt,
John Everding,
John H. Stevens,
William H. Wood
and
Frank V. Pool
By Chas. C. Gill
Attorney (No Model.) 2 Sheets—Sheet 2.

J. W. HYATT, F. V. POOL, J. EVERDING, J. H. STEVENS & W. H. WOOD.

APPARATUS FOR THE MANUFACTURE OF NITRO CELLULOSE.

No. 299,388. Patented May 27, 1884.

UNITED STATES PATENT OFFICE.

JOHN W. HYATT, FRANK V. POOL, JOHN EVERDING, JOHN H. STEVENS, AND WILLIAM H. WOOD, OF NEWARK, NEW JERSEY, ASSIGNORS TO THE CELLULOID MANUFACTURING COMPANY, OF NEW YORK, N. Y.

APPARATUS FOR THE MANUFACTURE OF NITRO-CELLULOSE.

SPECIFICATION forming part of Letters Patent No. 299,388, dated May 27, 1884.

Application filed February 19, 1884. (No model.)

*To all whom it may concern:*

Be it known that we, JOHN W. HYATT, FRANK V. POOL, JOHN EVERDING, JOHN H. STEVENS, and WILLIAM H. WOOD, all citizens of the United States, and residents of Newark, in the county of Essex and State of New Jersey, have invented certain new and useful Improvements in Apparatus for the Manufacture of Nitro-Cellulose, of which the following is a specification.

Our invention relates to the manufacture of nitro-cellulose, and especially to the use and manipulation of the acids by means of which the conversion of the fiber is effected. We contemplate its employment in the manufacture of that class or kind of nitro-cellulose which is designated as "soluble," to distinguish it from the classes or kinds which are insoluble, and of which insoluble grades or kinds explosive gun-cotton may be mentioned as an example, and in using the word "nitro-cellulose" in the specification we have in mind only the soluble grade or kind. As is well understood, two kinds of acids are used in the manufacture of nitro-cellulose—viz., sulphuric and nitric—which are combined in proportions that depend upon the character of the nitro-cellulose it is desired to produce, the strength of the acids, and other considerations. The most approved method of using the acids contemplates the fullest possible utilization of their strength. According to the methods heretofore pursued, after a charge or supply is used to effect the conversion of a batch of paper, a part of the charge is set aside and the remainder restored to the desired strength by the addition of fresh acids, the reserved part being treated to free it of flocculent matter, after which it is restored by means of fresh acids, and so utilized. It is also well understood that great difficulty has been experienced in so manipulating the acids as to produce a uniform quality of nitro-cellulose. The strength of the acid in carboys necessarily varies, and the acids are also subject to unequal changes during the various processes of converting the fiber, mixing, clarifying, &c. The practice has been to mix and use the acids for a day's work in fractional lots, with the result that, for the reason specified, the separate mixtures have necessarily varied more or less from each other. The consequence is that there is more or less variation in the product of a factory within a given length of time. The difference in the quality of the nitro-cellulose may not be very marked, but it must inevitably be such as to prejudicially affect the article in the manufacture of which it is utilized. It is therefore evident that the use of the acid in large batches, each uniform in itself, would to a great extent overcome these difficulties; but we believe it to be true that no satisfactory plan has ever heretofore been devised whereby the acids may be conveniently and economically handled in large quantities.

Our invention has for its object the correction of these difficulties and inconveniences; and it consists in the novel arrangement and connection of the necessary receptacles, the use of movable tanks and other appliances, whereby the objects sought to be accomplished are satisfactorily carried out, all as hereinafter more fully explained.

Figure 2:
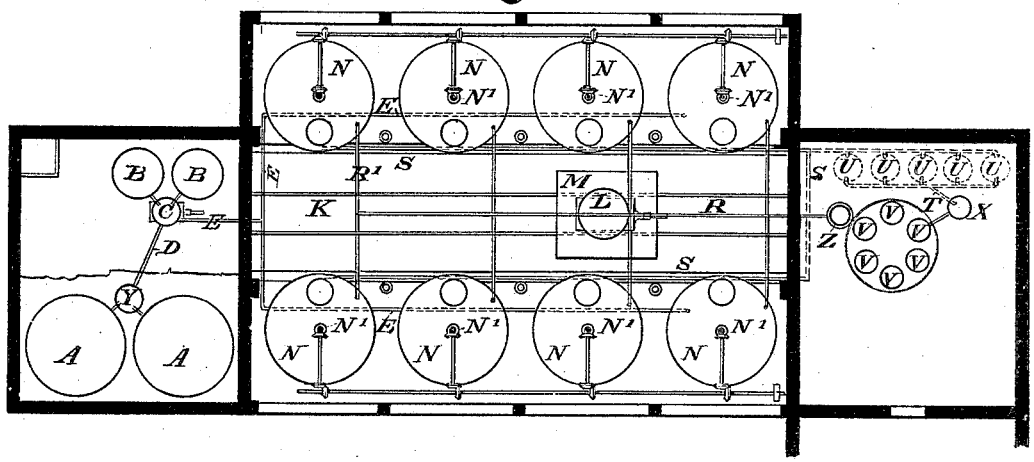
Figure 3:
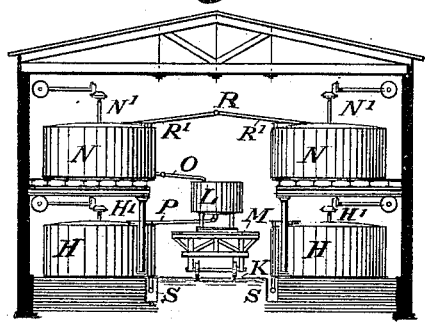
Figure 4:
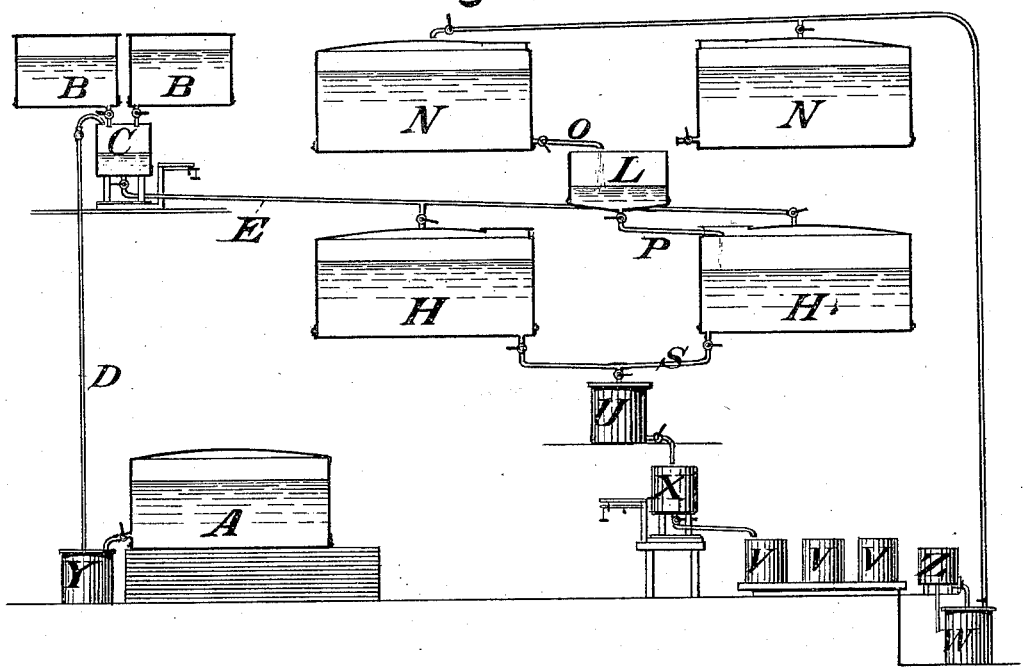
Figure 5:
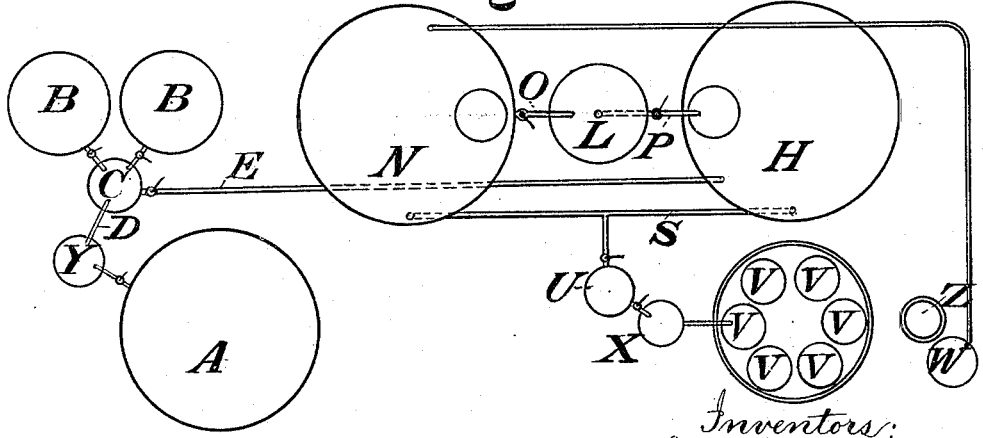

Referring to the accompanying drawings, Figure 1 is a longitudinal section through building containing an apparatus embodying our improvements; Fig. 2, a ground plan of the same; Fig. 3, a transverse section through the building containing the settling and storage tanks, and Figs. 4 and 5 show a modification of the same apparatus.

A A are the tanks intended to contain the sulphuric acid, which will be of a capacity of, say, forty thousand pounds each; B B, the equalizing-tanks for the nitric acid, of a capacity of, say, twelve thousand pounds each.

C is a weighing-tank, which, in the present instance, is connected by a pipe, D, with the pressure-pot Y, which in turn is connected with the tanks A A, the office of the pressure-pot being to deliver the sulphuric acid into the weighing-tank C by means of air-pressure, or as may be desired. Connection is made between tanks B and C by means of pipes or siphons. The weighing-tank C is also connected by means of the pipe E with the storage-tanks H, hereinafter described.

At a convenient distance from the tanks A and B and weighing-tank C are the storage-tanks H, in the present instance eight in number, and of a capacity of about one hundred thousand pounds each. They are provided with agitators for mixing the acids, and are arranged in parallel lines, four on each side of the railway K, constructed to travel on which is the weighing-tank L, which is mounted upon a car, M, at such height that the contents of the settling-tanks N, hereinafter described, may be conveniently delivered into it through the pipe O, and also that its contents may be emptied, when desired, through the pipe P into the storage-tanks H, as will be hereinafter more fully set forth. The eight storage-tanks H have above them, similarly arranged on each side of the railway K, eight settling-tanks, N, of a capacity of, say, one hundred thousand pounds each, which are connected with the pipe R by means of pipes R', to receive the spent acids from the converting-pots. The tanks are provided with agitators N', which are used for mixing the clarifying or settling agent with the spent acid. Connected with the storage-tank H is the pipe S, which leads to the temperature-regulating pots, U, each having in the present instance a capacity of two thousand pounds, in which the mixture of acids is warmed or cooled according to circumstances, for use in the converting-pots V. The pots U are inclosed in such a manner that air-pressure can be applied to force the acids through the pipe T to a small weigh-pot, X, from whence it is poured into the converting-pots V, and there mixed with the fiber. Near the turn-table, holding the pots V, is the centrifugal machine, Z, which is used to separate the acid from the converted fiber. After leaving the centrifugal machine, the acid is conveyed by means of the pipe R, heretofore referred to, to the settling-tanks N.

We prefer to construct our tanks of wrought-iron, and protect them from the corrosive action of the acids by acid-proof coatings.

For purposes of illustration, we assume that one of the storage-tanks contains the proper mixture of acids to be used in the process of converting the fiber into pyroxyline, and will follow this acid throughout the various operations. The mixture is first conveyed, by means of the pipes S, to the tempering-pots U, wherein it is brought to the proper temperature, and then delivered through the pipe E into an auxiliary vessel, X, in which the charge for each converting-pot is weighed or measured. In these pots V the fiber is thoroughly mixed with the acids and converted into pyroxyline. The acids are then separated from the pyroxyline by means of the centrifugal machine Z. As part of the acid is retained by the pyroxyline, the original amount is reduced. That which is saved is known as "spent acid," and is conveyed by means of the pipes R and R' to any one of the settling-tanks N. There the acid is allowed to settle—that is, it is permitted to remain until perfectly clear. This clarifying process is accomplished by any suitable means—for example, as described in Letters Patent of the United States granted to John W. Hyatt and Frank V. Pool, March 20, 1883, and numbered 274,335, for improvement in the manufacture of pyroxyline. After the acid has been freed from flocculent material, it is delivered to one of the storage-tanks H, the quantity being ascertained by means of the intermediate and portable weighing-tank, L. At this stage of the operation a sample of the acid is analyzed, to ascertain its composition and to determine the proper amount of fresh acids necessary to restore it to the condition for use in the converting-pots V V. The analysis having been made, the required amounts of fresh sulphuric and nitric acids are drawn from the tanks A and B, and weighed by means of the weighing-tank C, and delivered through the pipe E to the said storage-tank, wherein they are thoroughly mixed with the spent acid by stirrers or agitators H'. The mixture is now ready for use, and when required it is conveyed to the tempering-pots U U, and from thence to the converting-pots V V, as already shown.

Having described the successive steps in saving the spent acids and treating the same with the fresh acids, we will now explain the use of a number of storage and settling tanks, as shown in the drawings and referred to in this specification.

Each of the storage-tanks is to hold enough acids for the conversion of a determined quantity of fiber into pyroxyline, and the settling-tanks must, therefore, be large enough to receive all the spent acids which are left from this operation. It will also be seen that, allowing one of the storage-tanks to be empty for the purpose of cleaning, &c., one to be used for the mixing, and one to be drawn from, five tanks will remain, which may be kept full of acids ready for use. As it requires several days for the spent acids to settle, it is also necessary to provide a number of settling-tanks—say eight—as shown and described.

The weighing-tank L, which is mounted on a truck, can be connected with any of the settling-tanks N by means of the pipe O, and any quantity taken therefrom, weighed, and delivered into any one of the storage-tanks H through the pipe P, as may be desirable. Thus it will be easily understood means are provided to transfer the necessary quantity of the spent and clarified acid from any of the settling-tanks, and also the required quantities of fresh acids from the tank C to any storage-tank to form a fresh compound. The problem will be to bring the acid in any given tank to the desired strength without losing sight of the importance of utilizing the spent acids in the settling-tanks N, the quality and strength of which will vary in some way—that is, one settling-tank will of necessity contain a mixture of one strength, another tank a mixture of a different strength, and so on, having in mind the production in any one of the storage-tanks of a mixture of the proper strength.

By the use of this process the chemist in charge, having a record of the strength and character of all the acids, is enabled to give directions by which the acids are utilized to their full extent and more rapidly and economically than according to the methods which have heretofore been made use of.

In the manufacture of nitro-cellulose the moving of the mixed acids in large quantities has always been attended with many difficulties. This is due to the fact that very few substances will resist their corrosive action. It has generally been the practice to store and convey them in glass or earthenware vessels. In moving them from one place to another hand-labor has been largely employed, and the use of machinery, and especially pumping apparatus, has been avoided as much as possible. Where the employment of machinery has been necessary an apparatus has been used consisting of an earthenware pot inclosed in an air-tight tank, from which, by means of air-pressure, the acid can be forced through pipes to any convenient distance. The use of this apparatus necessitates separating the acid into fractional lots, because, for convenience and safety, the capacity of the pressure-pot is limited. It is also true that in the part of the process where the fiber is converted into pyroxyline it been found necessary, for the sake of convenience in handling the mixture, to separate the acid into fractional lots or batches. In our plan we take advantage of this necessary separation into batches by arranging the apparatus in such a manner that all mechanical lifting of acids is done at this point. The lifting operation can be performed either immediately before or after the acid has passed through the converting-pots V. For instance, when the apparatus is erected on a sloping ground or a hillside, it might be desirable to arrange the pots V at such a level that they will receive the acid from pots U by gravity, after which each batch of acid on leaving the centrifugal machine Z can be made to flow into a pressure-pot, W, situated at a lower level, from whence, by means of air-pressure, it can be forced into any one of the settling-tanks N, as shown in Figs. 4 and 5 of the drawings. We prefer, however, to lift the acids from the temperature-regulating pots U by means of air pressure, and have the converting-pots V situated at the highest level. By the peculiar arrangement of our apparatus the application of mechanical means for transferring the acid is limited to that part of the process where, for other important reasons, it becomes necessary to separate the acid into small lots, and thus we attain two objects in the same operation. Throughout the various other parts of the process the mixed acid is transferred entirely by gravity. The advantage of such an arrangement must be obvious to any one acquainted with the art, for, as previously stated, this use of gravity for conveying the mixed acid permits us to move it, from the time it leaves the centrifugal machine Z all through the various operations of clarifying and strengthening until it is finally delivered into the tempering-pots U, without the employment of a pump or similar device.

We have described and shown an arrangement of our apparatus which we believe to be a desirable one; but it is obvious that it may be changed in many particulars without departing from the spirit of the invention.

The number and location of the tanks are not essential considerations; nor is their size or capacity or the manner of moving the acids, although we prefer to employ the apparatus in substantially the manner described, and have claimed the specific method and apparatus we believe to be the best, as well as methods which employ the invention in modified forms.

What we claim as our invention, and desire to secure by Letters Patent, is—

1. An apparatus consisting of one or more storage-tanks, one or more settling-tanks, and a weighing or measuring tank, the weighing or measuring tank being connected with the storage-tanks and with the settling-tanks, for the uses and purposes substantially as described.

2. The weighing-tank L, in combination with a series of clarifying or settling tanks and storage-tanks, substantially as set forth.

3. The combination of the weighing-tank C and pipe E with the storage-tanks H, for the uses and purposes substantially as described.

4. The combination of the weighing-tank L, having the pipe P, with the settling-tanks having the pipe O, and with the storage-tanks, for the uses and purposes substantially as described.

5. The pipe P, connected with the weighing-tank, and the series of storage-tanks H, for the uses and purposes set forth.

6. An apparatus in which settling-tanks, storage-tanks, and a weighing tank or tanks are employed, substantially as set forth.

7. An apparatus in which a movable weighing-tank is used, in combination with a series of clarifying or settling and storage tanks, for the purpose of delivering a given quantity of spent acids into any particular storage-tank, substantially as set forth.

8. The combination of the tempering-pots U, pipe T, auxiliary weighing or measuring tank X, and the converting-pots V, substantially as set forth.

9. The arrangement of tanks and pipes by means of which the acids are conveyed from the pots V through the various processes until they reach the pots U, substantially as shown.

10. The arrangement of tanks and pipes by means of which the acids are conveyed by gravity from the pots V through the various processes until they reach the pots U, substantially as shown.

11. The arrangement of tanks and pipes by means of which the acids are conveyed by gravity from the settling-tanks N through the various processes until delivered into the pressure-pot W, substantially as shown.

12. The arrangement of tanks and pipes by means of which the acids are conveyed by gravity from the converting-pots V through the various processes until they reach the temperature-regulating pots U, and then returned to the pots V by air-pressure or other means which overcome the gravity, substantially as set forth.

13. The arrangement of tanks and pipes by means of which the acids are conveyed by gravity from the settling-tanks N through the various processes until they reach the pressure-pot W, and then returned to the settling-tanks N by air-pressure or other means that overcome the gravity.

14. An apparatus consisting of settling-tanks, storage-tanks, fresh-acid tanks, weighing or measuring tanks, temperature-regulating pots, converting-pots, centrifugal machine, and pipes for conveying acids, connected as described, and for the uses and purposes substantially as set forth.

Signed at New York, in the county of New York and State of New York, this 2d day of February, A. D. 1884.

JOHN W. HYATT.
FRANK V. POOL.
JOHN EVERDING.
JOHN H. STEVENS.
WILLIAM H. WOOD.

Witnesses:
CHAS. C. GILL,
HERMAN GUSTOW.